July 20, 1965 V. BAVARO 3,196,455
MOTION PICTURE APPARATUS WITH AN EXCHANGEABLE REEL
Filed July 15, 1960 4 Sheets-Sheet 1

INVENTOR.

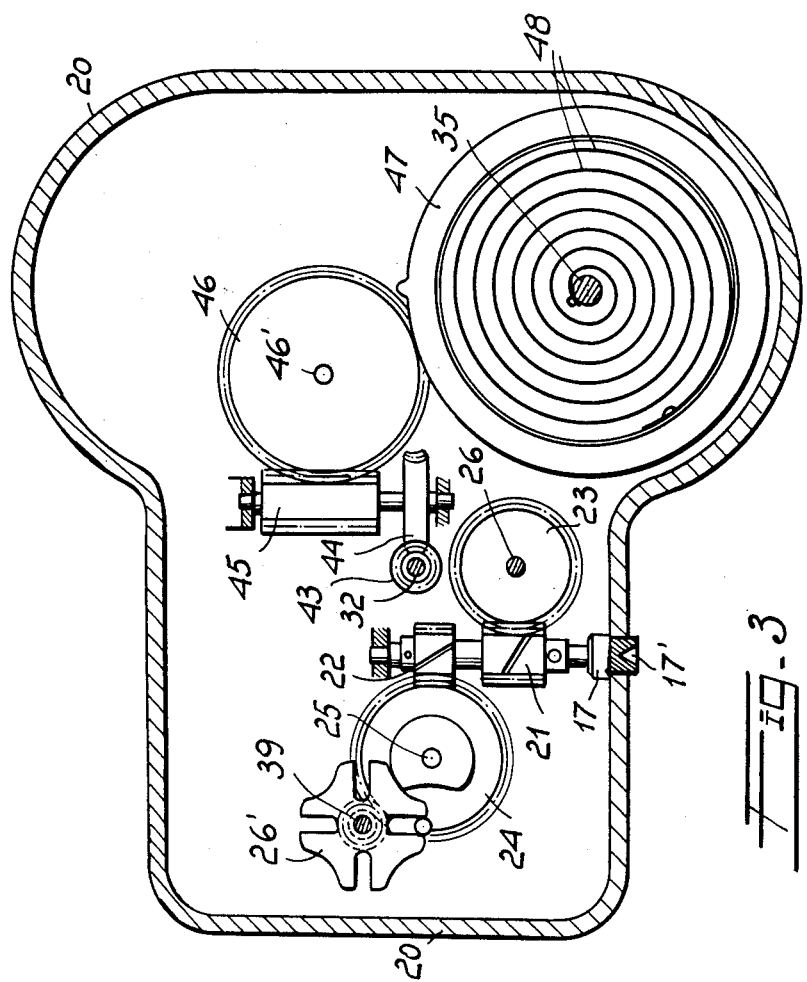

July 20, 1965 V. BAVARO 3,196,455
MOTION PICTURE APPARATUS WITH AN EXCHANGEABLE REEL
Filed July 15, 1960 4 Sheets-Sheet 4
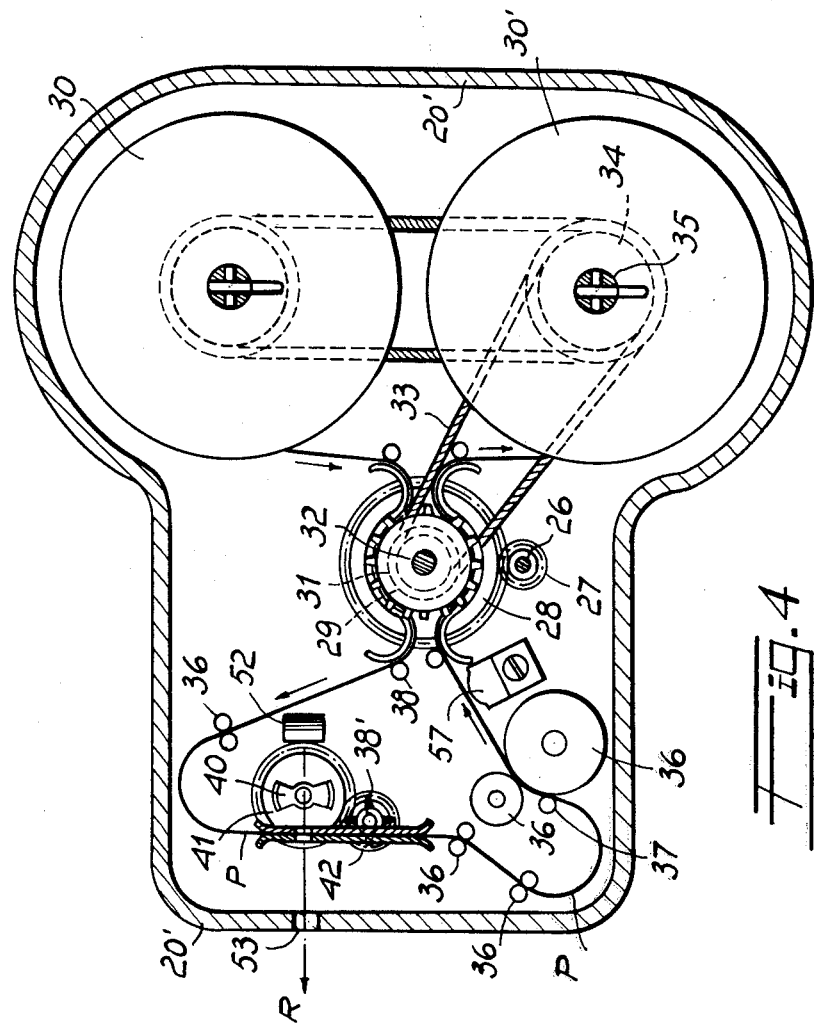
INVENTOR.

3,196,455
MOTION PICTURE APPARATUS WITH AN
EXCHANGEABLE REEL
Vincenza Bavaro, Viale Regina Margherita 2, Milan, Italy
Filed July 15, 1960, Ser. No. 43,241
4 Claims. (Cl. 352—8)

The present invention relates to a motion picture apparatus with exchangeable reels.

It is, therefore, one object of the present invention to provide a motion picture apparatus with selectable films which avoids the drawbacks of the known structures.

It is another object of the present invention to provide a motion picture apparatus with selectable films which comprises a housing and a plurality of magazines mounted on an endless chain disposed movably in the housing, the latter including also the light source and optical projection system to be operatively selectively connected with any one of the reels disposed in the respective magazines.

With these and other objects in view which will become apparent in the following detailed description, the present invention will be clearly understood in connection with the accompanying drawings, in which:

FIG. 3 is a section through the magazine along the lines X—X of FIG. 2; and

FIG. 4 is a similar section through the magazine along the lines Y—Y of FIG. 2.

Figure 1:
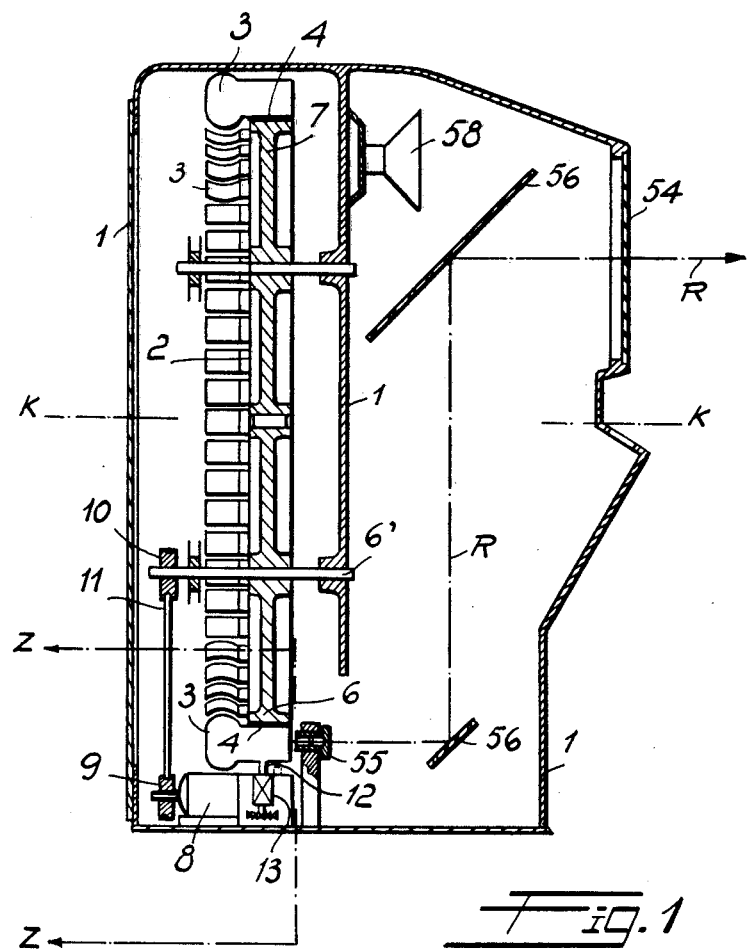
FIGURE 1 is a vertical section of the apparatus designed in accordance with the present invention.

Referring now to the drawings, the apparatus designed in accordance with the present invention comprises a housing 1 which receives the carrying means for a plurality of magazines 3, as well as supporting member 2 of a group of magazines 3, which supporting member 2 in turn supports the corresponding magazines 3 in accordance with the selected film or films.

The magazines 3, containing the films, can be exchanged by complementary dovetail means 4, one part being secured to the links of a chain 5 and the other part being secured to the magazine 3, as shown in FIG. 1. The chain 5 is mounted on two wheels 6 and 7, the bottom wheel 6 being in operative connection with, and driven by a motor 8 disposed at the base of the apparatus and the shaft of the motor 8 carries a pulley 9, while the shaft 6' of the wheel 6 carries the pulley 10, the pulleys 9 and 10 being in operative connection by means of a chain 11.

Figure 2:
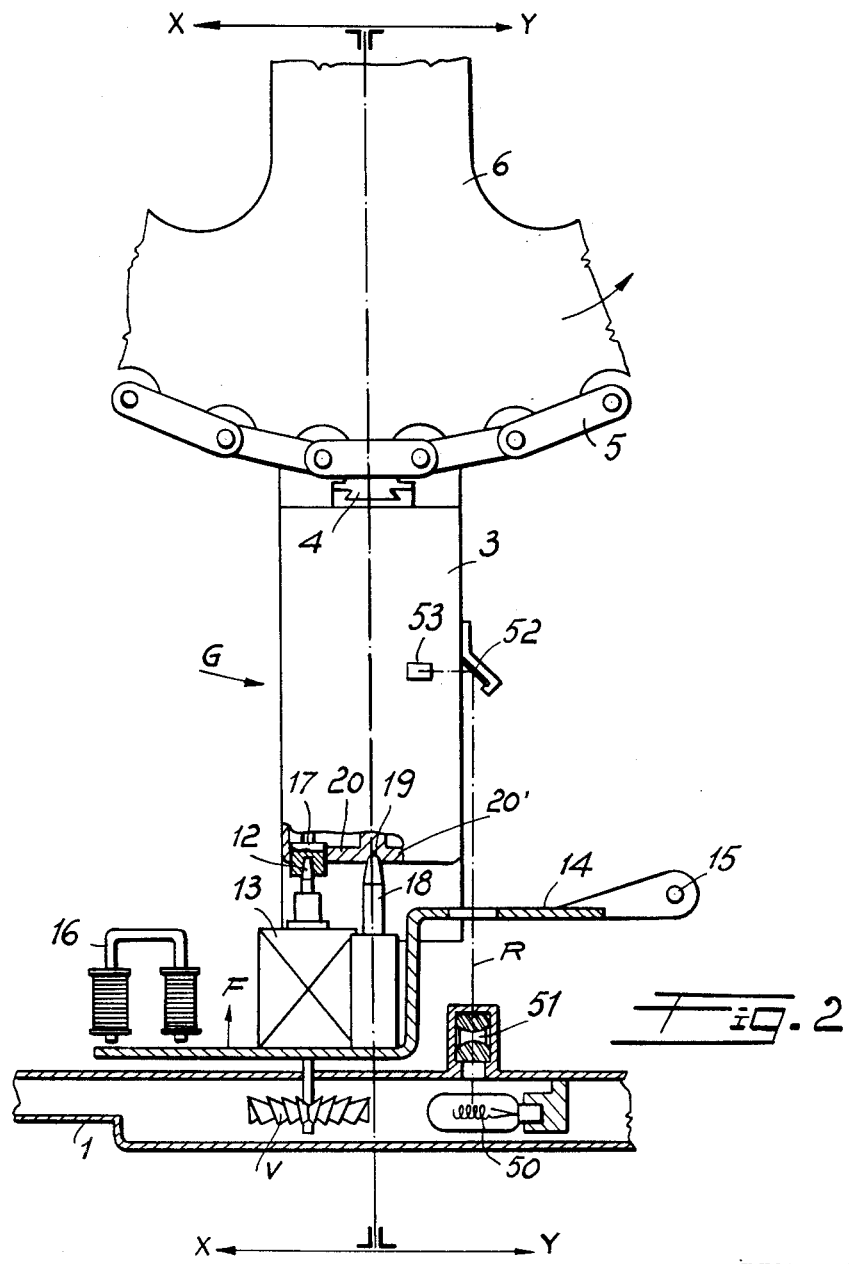
FIG. 2 is a fragmentary section along the lines Z—Z of FIG. 1, shown at an enlarged scale.

The motor 8 can be started by a conventional switch (not shown) disposed at the front of the housing 1. Upon operation of the motor 8, the magazine 3, containing the selected film, moves with the chain 5 in the direction of the arrow G until it reaches the working position (FIG. 2).

Upon reaching the working position the magazine 3, containing the selected film, is operatively connected with the shaft 12 of another motor 13 which starts the operation of the drive means for the film which are disposed inside of each of the magazines 3. To achieve this end, a lever 14 is provided which swings about a pivot 15 (FIG. 2) and the angular movement of the lever 14 in direction of the arrow F is caused by closing a circuit of an electromagnet 16, operated by the same unit that operates the film. The force exerted by the electromagnet 16 lifts the lever 14 and, thereby, moves the shaft 12 of the motor 13 in the recess 17' provided in the shaft 17 mounted in the magazine 3, which shaft 17 drives the members disposed in the magazine for projection of the film. A locking member 18 tapered at its upper end and extending slightly beyond the upper end of the shaft 12 is received in a recess 19 of the magazine 3 prior to the connection of the shaft 12 with the shaft 17. This arrangement makes possible the stoppage of each of the magazines 3 in the right position for proper operation of the projection members.

For the purpose of clarity of the drawing, the electric means for feeding the electromagnet 16 and the motors 8 and 13 have been omitted since these means are conventional and do not form part of the present invention.

Referring now again to the drawings, and in particular to FIGS. 3 and 4, every magazine 3 is subdivided into two parts, one part consists of a box 20 (FIG. 3) containing the essential members for the releasing and the rewinding of the film, and the other part consists of a box 20' of similar complementary configuration (FIG. 4) containing all essential members for the feeding and projecting of the film.

These two boxes 20 and 20' are joined one along side the other at their open sides by any conventional means, thus forming the magazine 3 which constitutes a single unit and is easily accessible for the exchange of a film.

Within the box 20 of each magazine 3 is disposed the shaft 17 in vertical position, referred to above. The shaft 17 has keyed thereto two continuous screws 21 and 22 which are in mesh with gears 23 and 24 respectively. The gear 24 is mounted on a shaft 25 and engages a gear 24' mounted on the shaft 39 which carries a Maltese cross 26'.

The wheel 23 is mounted on a shaft 26 disposed crosswise in the box 20 and extends to the box 20' of the same magazine 3, which shaft 26 carries a pinion 27 meshing a gear 28.

The gear 28 drives a toothed gear 29 which threads the film P. The film unwinds from the reel 30 to be wound onto reel 30'. This is brought about by a pulley 31 mounted on the shaft 32 which also carries the toothed gear 29 and an elastic belt 33 operatively connected with the pulley 34 mounted on the shaft 35 of the reel 30'. In other words, the pulley 31 is secured to the shaft 32 and the elastic belt 33 drives yieldingly the two pulleys 31 and 34 and, thereby, controls the rotating speed of the latter.

The film P, unwinding from the reel 30 onto the reel 30', is fed by the rollers 36 and guides 37. The conventional marginal perforations of the film receive the teeth of a wheel 38'.

A U interceptor 40 is disposed adjacent the film P during its run from one reel 30 to the other reel 30', and is rotated by a gear 41. The gear 41 is in mesh with a gear 42, mounted on the shaft 39, thereby providing complete synchronization of all moving members of the apparatus.

In order to provide for the automatic return of the film from the reel 30' to the reel 30, means are provided in the box 20 which includes at least one spring 48 which causes the return of the film.

These return means comprise a continuous screw 43, mounted on the shaft 32, the screw 43 being in engagement with the gear 44 which is mounted on the shaft 44' which carries another continuous screw 45, which in turn engages a gear 46 freely turning about its axle 46'.

The gear 46 is in mesh with another gear $46^2$ which is mounted on the shaft 35, carrying a disk 47 to which one end of a spiral spring 48 is secured. The spring 48 is wound during the feeding of the film P from the reel 30 to the reel 30'. Upon relaxation of the electromagnet 16, the locking member 18 as well as the shaft 17' is withdrawn and the remounting of the film P will start immediately by using the force of the spring 48. By this arrangement, the film winds automatically from the reel 30' to the reel 30. The disk 47 has a protrusion 49 in order to secure the disk 47 in a predetermined position.

Referring now again to the drawings, and in particular to FIGS. 1 and 2, the optical system for the projection of the film on a screen 54, provided in the housing 1, comprises a source of light 50, which is conventional an electric bulb placed at the bottom of the housing 1 and cooled by a fan V which is disposed adjacent the source of light 50 in the housing 1. The light rays R, emanating from the source of light 50, pass through an optical condenser 51 and are reflected by mirrors 52 towards the film P and emerge then through a small opening 53 of the magazine 3 to reproduce the image on the screen 54, after crossing the lens 55 and the mirrors 56, as shown in FIG. 1.

A small magnetic head 57 (FIG. 4) of the conventional type used with the loudspeaker 58 (FIG. 1), and disposed in the box 20' adjacent the passing film, transmits the sound in complete synchronization with the images on the screen 54.

In order to turn the unit on and also to make selection of the desired film, the motor 8 is started. This starts the movement of the chain 5 in the direction of the arrow G (FIG. 2) and, thereby, of the selected group 2.

This selected group 2 will stop when the magazine 3, corresponding with the selected group 2, is locked by the shaft 18 due to the angular movement of the lever 14 in the direction of the arrow F caused by inciting of the electromagnet 16. The shaft 12 of the motor 13 will then connect with the shaft 17 and start operation of the members for film advance and sound reproduction for the presentation of the film on the screen 54.

After showing the complete film, it will rewind from the reel 30' onto the reel 30, by means of the spring 48. While the film is rewinding, the electromagnet 16 is inoperative and the shaft 12 remains in disengaged position with the shaft 17, in order to return the unit into starting position, as shown in FIG. 1.

While I have disclosed one embodiment of the present invention, it is to be understood, that this embodiment is given by example only and not in a limiting sense, the scope of the present invention being determined by the objects and the claims.

I claim:

1. The combination with a single projector means for motion picture films including a housing, at least two chain wheels rotatably mounted in said housing, a chain carried by said chain wheels, a plurality of magazines releasably secured to said chain and placeable into any position on said chain, a source of light and optical condenser means coordinated to said source of light disposed in said housing, means for moving said chain, a lever pivotally mounted in said housing, a motor having a first shaft mounted on said lever, electro-magnetic means for lifting said motor with said first shaft a locking member projecting upwardly in said housing and terminating at a level higher than the uppermost point of said first shaft, each of said magazines comprising two boxes releasably connected to form a single unit, two film reels and film advancing means received by one of said boxes, a shutter mechanism positioned in coordination to said film advancing means and received by the other of said boxes, a second shaft mounted in said other of said boxes and carrying a first gear, gear means in engagement with said first gear for operation of said film advancing means and of said shutter means, each of said magazines having a recess in its outer face disposed at the same predetermined point in all said magazines and complementary to the upper portion of said locking member and adapted to receive said upper portion of said locking member upon travel of said magazines opposite said locking member and simultaneous operation of said electro-magnetic means, said second shaft projecting through the wall of said other of said other boxes and having a recess at its outer end face, said first shaft having an upper end complementary to said recess of said second shaft and received in said recess of said second shaft to form a releasable driving connection between said motor and said film advancing means and said shutter mechanism.

2. The combination, as set forth in claim 1, which includes a plurality of first mirrors secured to each of said magazines in order to direct the light rays emanating from said source of light toward said film disposed in the corresponding of said magazines, a plurality of second mirrors disposed in said housing to reproduce an image of said film having a sound track on said screen, said one of said boxes having an opening opposite said passing film to permit the emergence of the light rays from said one of said boxes onto said screen, and means for reproducing sound from said sound track of said film.

3. The combination, as set forth in claim 1, wherein said other of said boxes includes a disc rotatably mounted therein and secured to one of the gears of said gear means, a spring box immovably mounted in said other of said boxes, a helical spring disposed in said spring box, one end of said spring being secured to said rotatable disc and the other end of said spring being secured to said spring box, and said spring being adapted to be wound during the unwinding of said film and to cause return winding upon complete unwinding of said film.

4. The combination, as set forth in claim 1, wherein said gear means for unwinding said film comprises two continuous screws, each of said screws engaging a corresponding gear, a Maltese cross rotatably mounted in said other of said boxes and one of said corresponding gears driving said Maltese cross.

References Cited by the Examiner

UNITED STATES PATENTS

| | | | |
|---|---|---|---|
| 1,221,515 | 4/17 | Davidson | 352—188 |
| 2,180,639 | 11/39 | McMahon et al. | 352—8 |
| 2,206,134 | 7/40 | Streyckmans | 352—8 |
| 2,290,071 | 7/42 | Rinaldy | 352—123 |
| 2,293,195 | 8/42 | Cohen | 85—41 |
| 2,781,689 | 2/57 | Heyer | 242—55.01 |

NORTON ANSHER, *Primary Examiner.*

EMIL G. ANDERSON, G. Y. CUSTER, EVON C. BLUNK, *Examiners.*